United States Patent [19]

Hashimoto et al.

[11] Patent Number: 4,597,055
[45] Date of Patent: * Jun. 24, 1986

[54] ELECTRONIC SENTENCE TRANSLATOR

[75] Inventors: Shintaro Hashimoto, Ikoma; Masafumi Morimoto, Yamatokoriyama; Kunio Yoshida, Nara; Hisao Morinaga, Nara; Tosaku Nakanishi, Nara; Shigenobu Yanagiuchi, Tenri, all of Japan

[73] Assignee: Sharp Kabushiki Kaisha, Osaka, Japan

[*] Notice: The portion of the term of this patent subsequent to Oct. 25, 2000 has been disclaimed.

[21] Appl. No.: 286,534

[22] Filed: Jul. 24, 1981

[30] Foreign Application Priority Data

Jul. 31, 1980 [JP] Japan .................. 55-106884

[51] Int. Cl.[4] .............................................. G06F 15/38
[52] U.S. Cl. ..................................................... 364/900
[58] Field of Search ............... 364/419, 200 MS File, 364/900 MS File

[56] References Cited

U.S. PATENT DOCUMENTS

| | | | |
|---|---|---|---|
| 4,130,882 | 12/1978 | Swanstrom et al. | 364/900 |
| 4,158,236 | 6/1979 | Levy | 364/900 |
| 4,159,536 | 6/1979 | Kehoe et al. | 364/900 |
| 4,218,760 | 8/1980 | Levy | 364/900 |
| 4,339,806 | 7/1982 | Yoshida | 364/900 |
| 4,355,370 | 10/1982 | Yanagiuchi | 364/900 |
| 4,365,315 | 12/1982 | Jamnik | 364/900 |
| 4,373,192 | 2/1983 | Yanagiuchi et al. | 364/900 |
| 4,412,305 | 10/1983 | Yoshida | 364/900 |
| 4,417,319 | 11/1983 | Morimoto et al. | 364/900 |

FOREIGN PATENT DOCUMENTS 2014765A 11/1978 United Kingdom ................ 364/900

Primary Examiner—Raulfe B. Zache
Attorney, Agent, or Firm—Birch, Stewart, Kolasch & Birch

[57] ABSTRACT

An electronic translator is characterized in that a new translated sentence is prepared by using at least one word contained in a sentence key inputted those cases where no word corresponding to the word is stored in a memory for storing a plurality of translated words. The translator comprises an input circuit for inputting the sentence, an access circuit for accessing a most equivalent translated sentence, and a detection circuit for detecting whether all of the words contained in the sentence are stored in memory and for inserting such unstored words directly into the translated sentence.

37 Claims, 26 Drawing Figures

| H\L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A | B | C | D | E | F | G | H | I | J | K | L | M | N | O | P |
| 1 | Q | R | S | T | U | V | W | X | Y | Z | | | | | | |
| 2 | AN | BA | BE | BO | BU | CA | CH | CK | CL | COM | CON | CO | DA | DE | DI | DO |
| 3 | EN | EX | FA | FE | FI | FO | FUL | GE | GH | GO | HA | HE | HI | HO | IN | KE |
| 4 | KI | LA | LE | LI | LO | LY | MA | ME | MI | MO | MU | ND | NE | NG | NI | NO |
| 5 | NT | ON | PA | PE | PI | PO | PU | RA | RE | RI | RO | SA | SE | SH | SI | SO |
| 6 | ST | SU | TA | TE | TH | TI | TO | TU | TY | UN | VE | VI | WA | WE | WI | WO |
| 7 | 0 | 1 | 2 | 3 | 4 | 5 | 6 | 7 | 8 | 9 | $ | C₀ | C₁ | C₂ | C₃ | C₄ |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | C₅ |

FIG. 6

| Bit 8 | 7 6 5 4 3 2 1 |
|---|---|
| 1 | A |
| 1 | N |
| 0 | AN |
| 1 | B |
| 1 | A |
| 0 | BA |
| 1 | B |
| 1 | E |
| 0 | BE |
| 1 | B |
| 1 | O |
| 0 | BO |
| 1 | B |
| 1 | U |
| 0 | BU |
| 1 | C |
| 1 | A |
| 0 | CA |
| 1 | C |
| 1 | H |
| 0 | CH |
| 1 | C |
| 1 | K |
| 0 | CK |
| 1 | C |
| 1 | L |
| 0 | CL |
| 1 | C |
| 1 | O |
| 1 | M |
| 0 | COM |
| 1 | C |
| 1 | O |
| 1 | N |
| 0 | CON |
| 1 | C |
| ⋮ | ⋮ |

| | |
|---|---|
| ⋮ | ⋮ |
| 1 | T |
| 1 | H |
| 0 | TH |
| 1 | T |
| 1 | I |
| 0 | TI |
| 1 | T |
| 1 | O |
| 0 | TO |
| 1 | T |
| 1 | U |
| 0 | TU |
| 1 | T |
| 1 | Y |
| 0 | TY |
| 1 | U |
| 1 | N |
| 0 | UN |
| 1 | V |
| 1 | E |
| 0 | VE |
| 1 | V |
| 1 | I |
| 0 | VI |
| 1 | W |
| 1 | A |
| 0 | WA |
| 1 | W |
| 1 | E |
| 0 | WE |
| 1 | W |
| 1 | I |
| 0 | WI |
| 1 | W |
| 1 | O |
| 0 | WO |
| 1 | 1 1 1 1 1 1 1 | ← $C_6$

FIG. 7

| | | |
|---|---|---|
| 1 | W | |
| 0 | H | |
| 0 | EN | |
| 1 | SH | WHEN SHOULD |
| 0 | O | I (CHECK IN)? |
| 0 | U | |
| 0 | L | |
| 0 | D | |
| 1 | I | |
| 1 | 1 1 1 1 0 1 0 | ←$C_{11}$ |
| 0 | CH | |
| 0 | E | |
| 0 | CK | |
| 1 | 1 1 1 1 0 1 0 | ←$C_{11}$ |
| 0 | IN | |
| 1 | 1 1 1 1 1 0 0 | ←$C_8$ |

FIG. 8(b)

| | | |
|---|---|---|
| 1 | 1 1 1 1 0 1 1 | ←$C_{12}$ |
| 0 | ト | |
| 0 | ウ | |
| 0 | キョ | |
| 0 | ウ | |
| 1 | ユ | (トウキョウ)ユキノ |
| 0 | キ | キップ ガ |
| 0 | ノ | (2)マイ |
| 1 | キ | ホシイ. |
| 0 | ップ | |
| 0 | プ° | |
| 1 | ガ゛ | |
| 1 | 1 1 1 1 0 1 0 | ←$C_{11}$ |
| 0 | 2 | |
| 1 | マ | |
| 0 | イ | |
| 1 | ホ | |
| 0 | シ | |
| 0 | イ | |
| 1 | 1 1 1 1 1 1 0 | ←$C_7$ |

FIG. 8(c)

| | | | | | | | | |
|---|---|---|---|---|---|---|---|---|
| 1 | 1 | 1 | 1 | 1 | 0 | 1 | 0 | $C_{11}$ |
| 0 | ミ | | | | | | | |
| 0 | ル | | | | | | | |
| 0 | ク | | | | | | | |
| 1 | ヲ | | | | | | | |
| 0 | モ | | | | | | | |
| 0 | ウ | | | | | | | |
| 0 | ス | | | | | | | |
| 0 | コ | | | | | | | |
| 0 | シ | | | | | | | |
| 1 | ク | | | | | | | |
| 0 | ダ゛ | | | | | | | |
| 0 | サ | | | | | | | |
| 0 | イ | | | | | | | |
| 1 | 1 | 1 | 1 | 1 | 1 | 1 | 0 | $C_7$ |

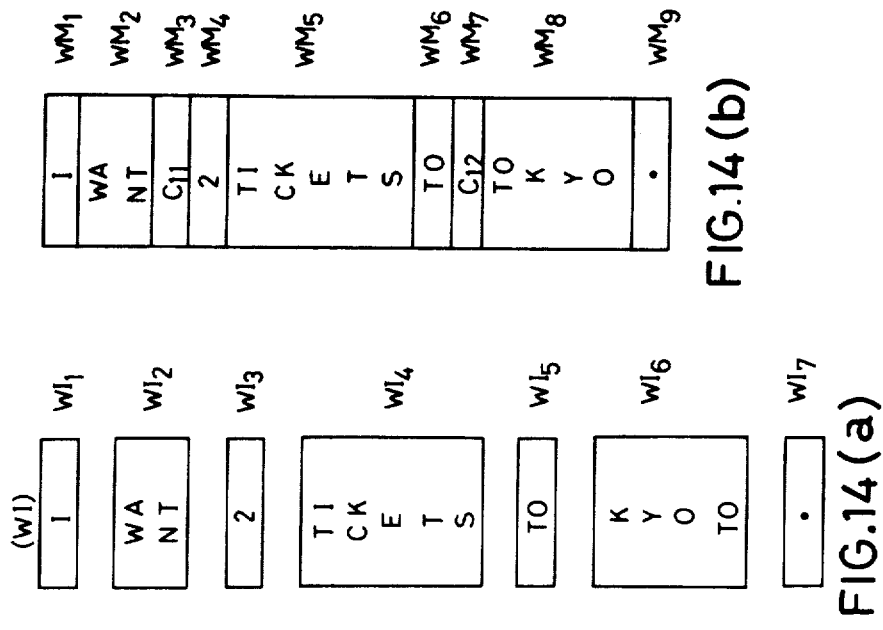
FIG.14(a)
FIG.14(b)
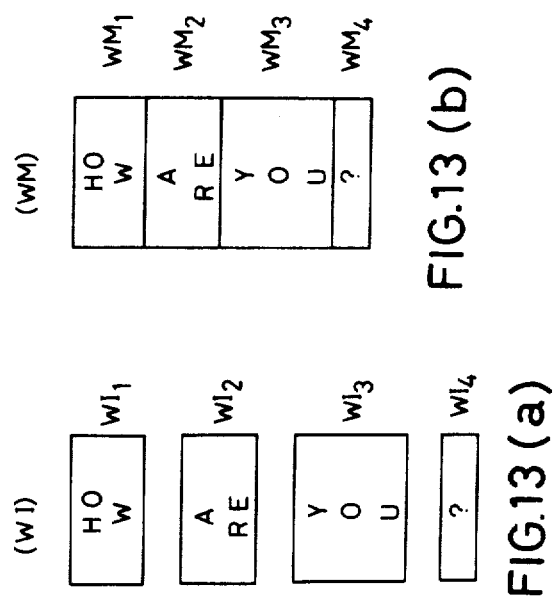
FIG.13(a)
FIG.13(b)

ELECTRONIC SENTENCE TRANSLATOR

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from any conventional type of electronic device in that the former is of a unique structure which provides for efficient and rapid retrieval of word information stored in a memory.

The conventional electronic translator has a circuit for outputting corresponding translated sentences in a selected language in response to the input of original sentences in a first language. To obtain the translated sentences which are correct in a grammatical sense in the selected language, it was necessary to provide a memory for storing a great number of pairs of original sentences and translated sentences. The memory was addressed to obtain the translated sentences, depending on the original sentences inputted. However, the access was rather complex to do and the access time to such a memory was long.

Therefore, it is highly desirable to provide very fast access for permitting outputting of the translated sentences in response to the inputting of the original sentences while maintaining grammatical correctness.

SUMMARY OF THE INVENTION

Accordingly, it is an object of the present invention to provide an improved electronic translator for enabling very quick access for outputting of the translated sentences in response to the inputting of the original sentences while maintaining grammatical correctness.

It is another object of the present invention to provide an improved electronic translator for making translated sentences by using a word which is inputted and is not contained as data for the translated sentences in a memory.

Briefly described, in accordance with the present invention, an electronic translator is characterized in that a new translated sentence is prepared by using at least one word contained in a sentence key inputted in the case where no word corresponding to the word is stored in a memory for storing a plurality of translated words. The translator comprises an input circuit for inputting the sentence, an access circuit for accessing a translated sentence, and a detection circuit for detecting whether all of the words contained in the sentence correspond to translated words.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 6 shows a table representing letters, compression codes, and control codes used in the word data region A of FIG. 5;

FIG. 7 shows a detailed format of a compression table in the format of FIG. 4;

FIGS. 8(a) through 8(d) show detailed formats of a sentence data region SN in the format of FIG. 4(a);

FIGS. 9 through 12(b) show flow charts of operation of this translator according to the present invention.

FIGS. 13 and 14 show the storage format of buffers;

FIG. 15(a) shows another detailed format of the word data region WA in the format of FIG. 4(a); and FIG. 15(b) shows another detailed format of the sentence data region SA in the format of FIG. 4(a).

DESCRIPTION OF THE INVENTION

First of all, any language can be applied to an electronic translator of the present invention. An input word is spelled in a specific language to obtain an equivalent word, or a translated word spelled in a different language corresponding thereto. The languages can be selected freely.

Figure 1:
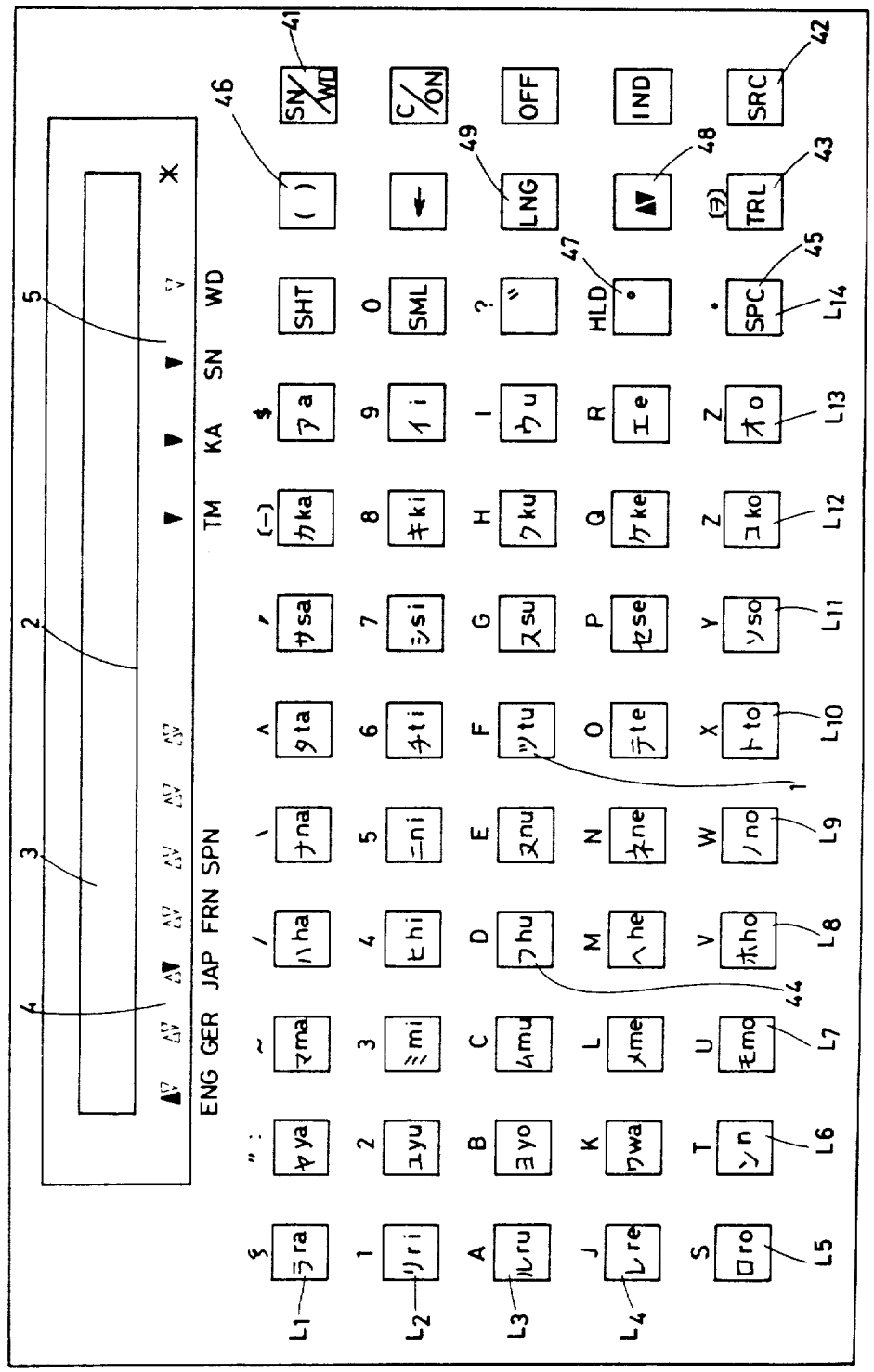
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator 3, a language indicator 4 and a symbol indicator 5.

The character indicator 3 shows characters processed by this translator. The language indicator 4 shows symbols used for representing the kind of the mother language and the foreign language then being processed by the translator. The symbol indicator 5 shows symbols used for indicating operating conditions in this translator.

Figure 2:
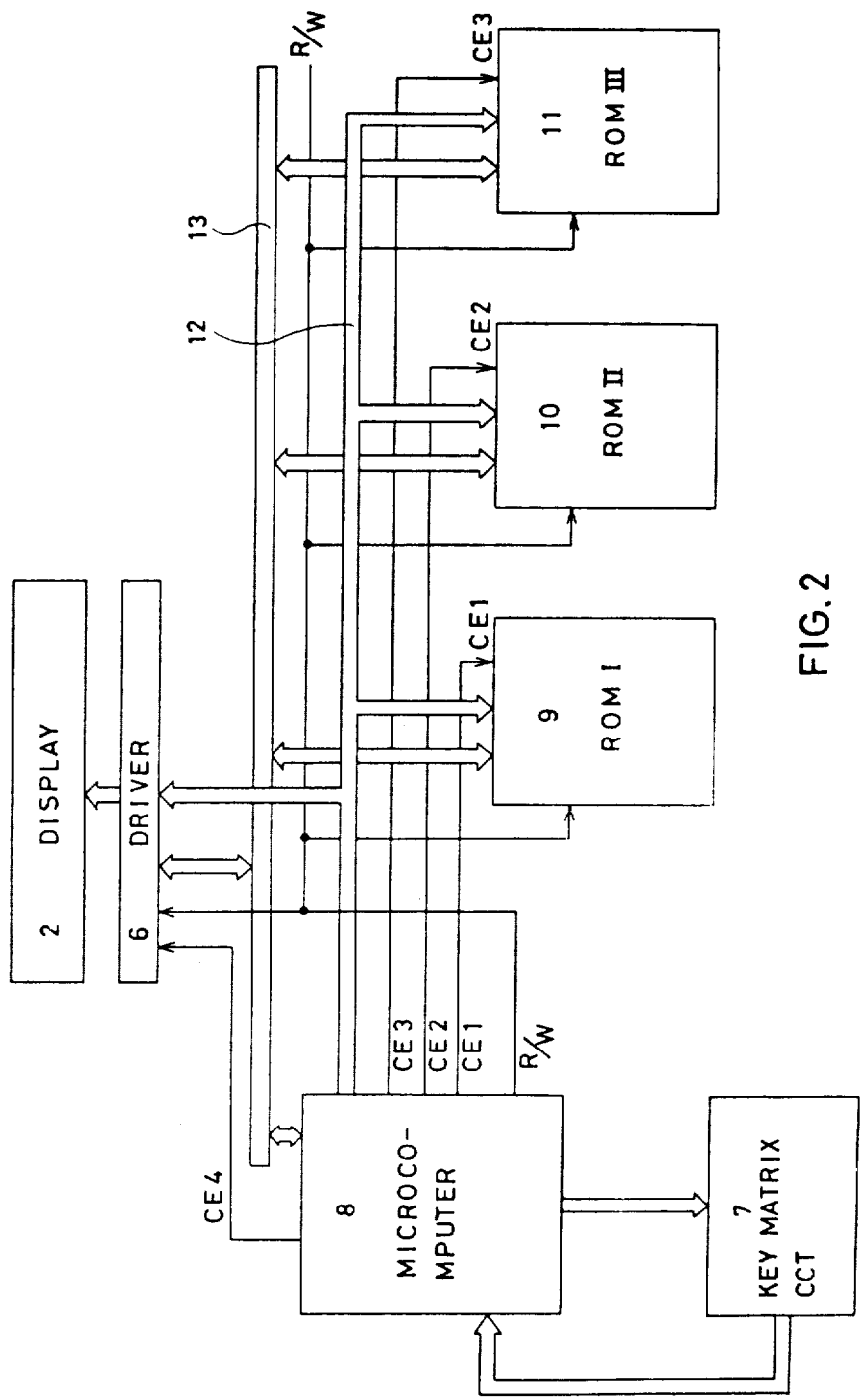
FIGS. 2, 3(a) and 3(b) show a block diagram of a control circuit implemented within the translator as shown in FIG. 1.

FIG. 2 shows a block diagram of a control circuit implemented in the translator according to the present invention. The circuit comprises the indicator 2, a driver 6, a key matrix circuit 7, a microcomputer 8, ROM I 9, ROM II 10, and ROM III 11. The circuit 7 functions with the keyboard 1 of FIG. 1. The circuit 7 is connected to terminals of the microcomputer 8 for developing key strobe signals and key input signals. Each of the ROM's 9 to 11 contains words and/or sentences used by the translator.

According to a preferred embodiment of the present invention, each one of the ROM's 9 to 11 corresponds to one language. For example, the ROM I 9 stores a plurality of English words, the ROM II 10 stores a number of Japanese words and the ROM III 11 stores a number of German words. Preferably, the ROM I 9 is built into the translator so that it can not be removed from the translator for exchange purposes. However, it is preferable that each of the ROM II 10 and the ROM III 11 can be removed from the translator and replaced by another type of ROM as module 1 or 2 to permit the user to translate between the mother language (here English) and additional foreign languages such as French or Spanish (see FIG. 1).

Each of the ROM's 9 to 11 is connected to the microcomputer 8 through an address bus 12 and a data bus 13. Chip selection signals $CE_1$, $CE_2$ and $CE_3$ are developed by the microcomputer 8 to select one of the ROM's 9 to 11. Words and/or sentences are applied to the microcomputer 8 from the selected ROM. $CE_4$ indicates a chip selection signal for the driver 6. "R/W" indicates a read/write signal for selecting a read or write operation.

Figure 3:
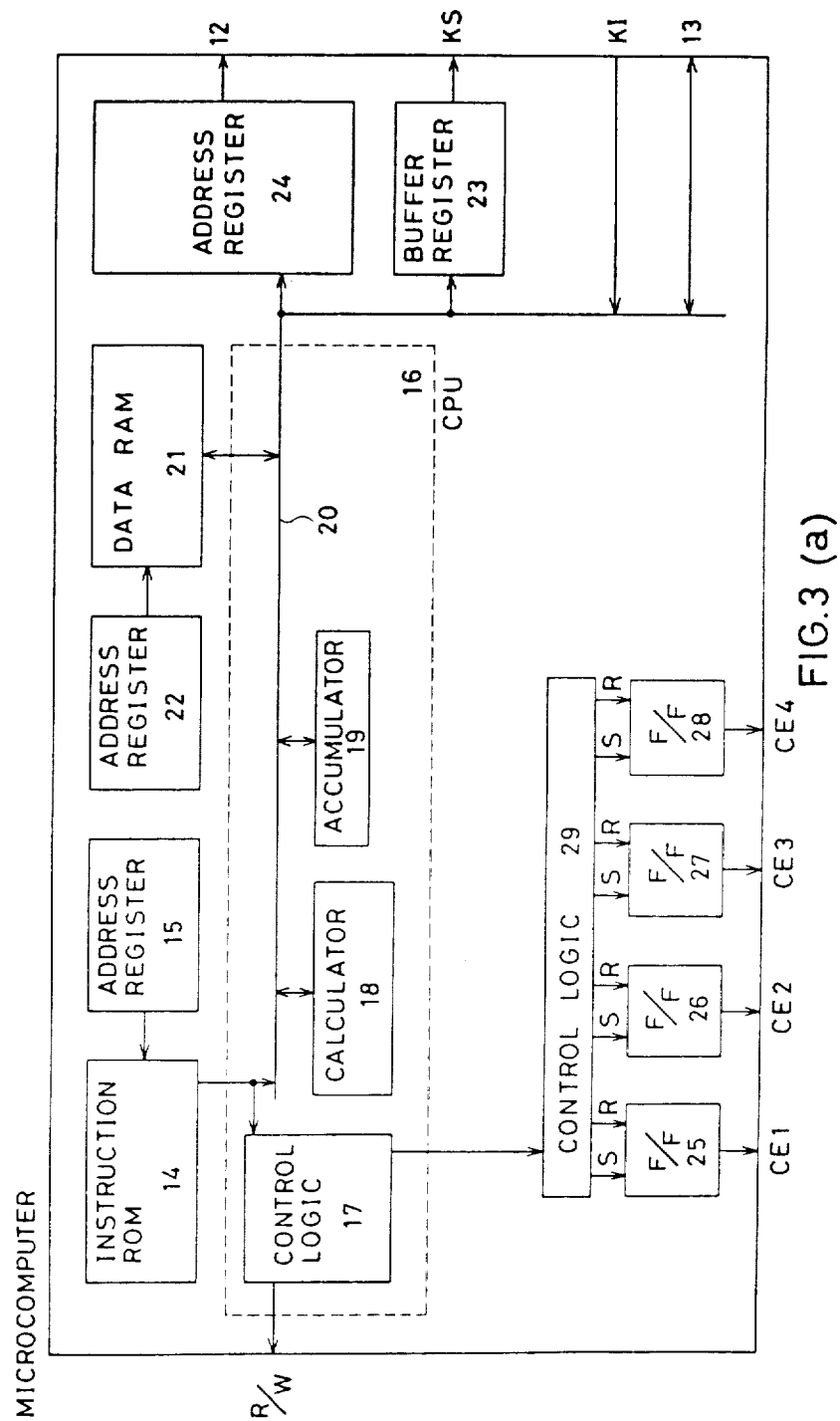
Figure 3:
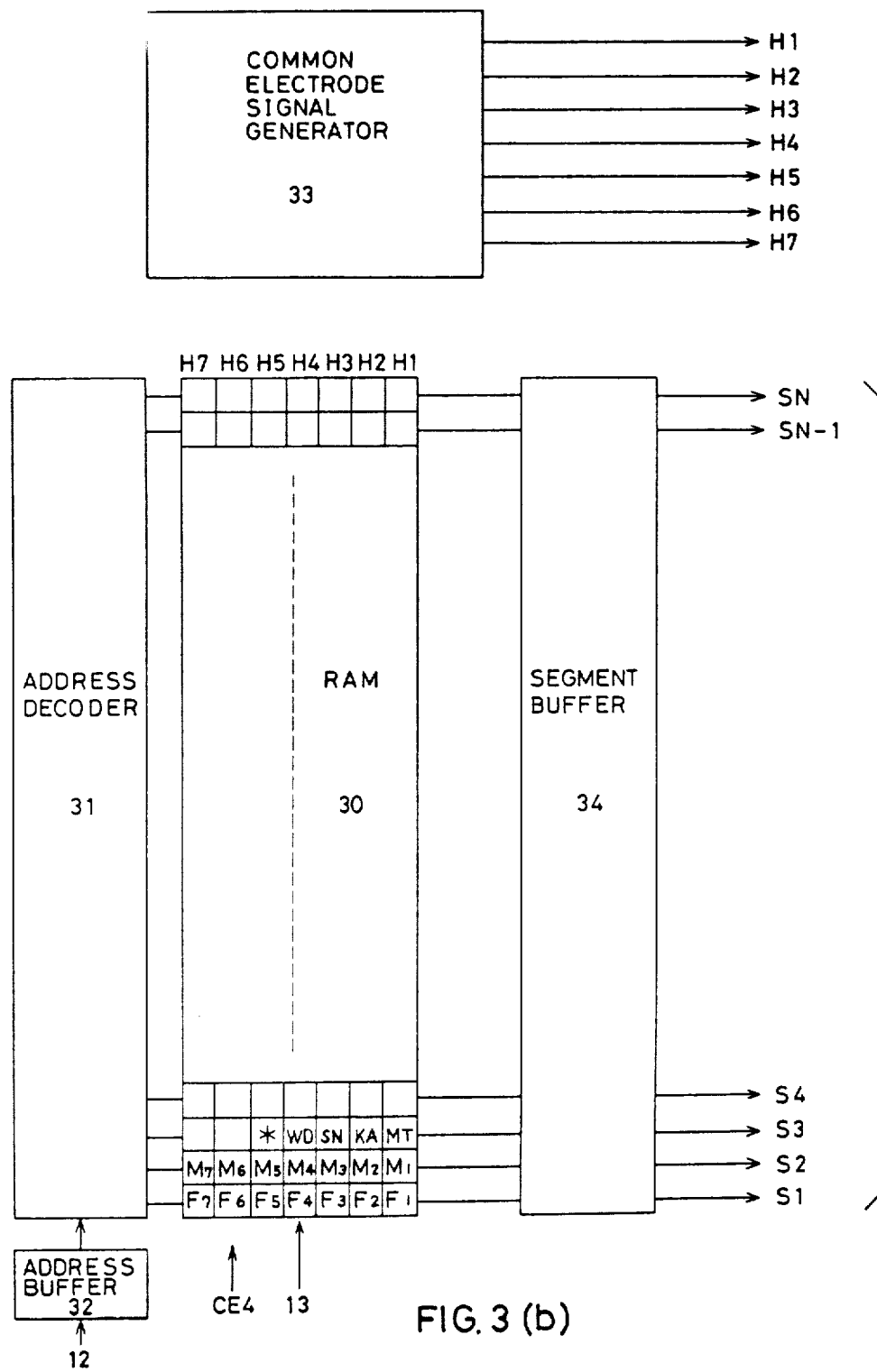

FIG. 3(a) shows a block diagram of the microcomputer 8 of FIG. 2. An instruction ROM 14 stores a number of kinds of instruction, each of which is used to perform a specific operation by the translator and is, preferably, in coded format. As the address of a ROM address register 15 is, in turn, advanced, the ROM 14 provides a specific instruction. The specific instruction is applied to a CPU 16 so that the CPU 16 understands its instruction to provide the selected operation.

The CPU 16 comprises a control logic 17, a logic calculator 18, and an accumulator 19. An internal data bus is indicated by the reference numeral 20. Data RAM 21 is provided for preliminarily containing data used for the translator and for functioning as a conditional flip-flop used for a branch in a program operation. Data from the CPU 16 is stored in a specific location within the data RAM 21 which location is selected by a RAM address register 22. The data stored in such a location within the RAM 21 is applied to the CPU 16.

Reference numeral 23 represents an output buffer register for outputting key strobe signals KS in turn to the key matrix circuit 7 so that the output of this circuit 7 is applied to the CPU 16 as key input signals KI. Reference numeral 24 indicates an address register for selecting the address of the external memory including the ROM's 9 to 11 and a RAM circuit within the driver 6. The output of the address register 24 is fed through the address bus 12. Control of the address register 24 to select increment or decrement and a certain address is carried out by the CPU 16. Since the CPU 16 is coupled to the data bus 13 as shown in FIG. 2, transmission of the data between the CPU 16 and the external memory is accomplished by use of the data bus 13. The direction of transmission of the data between them is defined with the read/write signal R/W.

Each of flip-flop circuits 25 to 28 is set or reset by a control logic 29. The control logic 29 is controlled by the CPU 16. The output of each of the flip-flops 25 to 28 is referred to as chip selection signals $CE_1$ to $CE_4$, respectively.

FIG. 3(b) shows a block diagram of the driver 6 of FIG. 2. According to a preferred embodiment of the present invention, the indicator 2 comprises a liquid crystal display. The character indicator 3 is formed as a 5×7 dot matrix in a single digit. One symbol of the language indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1" is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is made dark.

In FIG. 3(b), $S_1$, $S_2$ and $S_3$ refer to segment electrode signals used for illuminating symbols. $S_4$ to $S_N$ refer to segment electrode signals used for indicating characters. $H_1$ to $H_7$ represent common electrode signals. $M_1$ to $M_7$ represents a symbol " " of the language indicator 4, the symbol indicating the mother or original language which is to be translated with the translator of the present invention. $F_1$ to $F_7$ represent another symbol " " of the same indicator 4, this symbol indicating the foreign or translated language into which the translator of the present invention translates a selected word or words from the original language.

Further in FIG. 3(b), numerals 1 to 7 when used as the suffixes are intended to refer to English, German, Japanese, French, Spanish, another language "O", and further language "Δ", respectively. MT indicates a multivocal word. KA indicates a Japanese "Katakana" letter. SN represents a sentence while WD represents a word. A star "*" indicates that each of words represented in the mother or original language is translated into each of corresponding words represented in the foreign or translated language while the grammatical correction and modification meeting with that foreign language is not carried out.

The driver 6 provides display signals to the indicator 2 when display data is produced by the microcomputer 8 to apply them to the RAM 30. Since the driver 6 is of otherwise conventional design, further description thereof is omitted.

Figure 4:
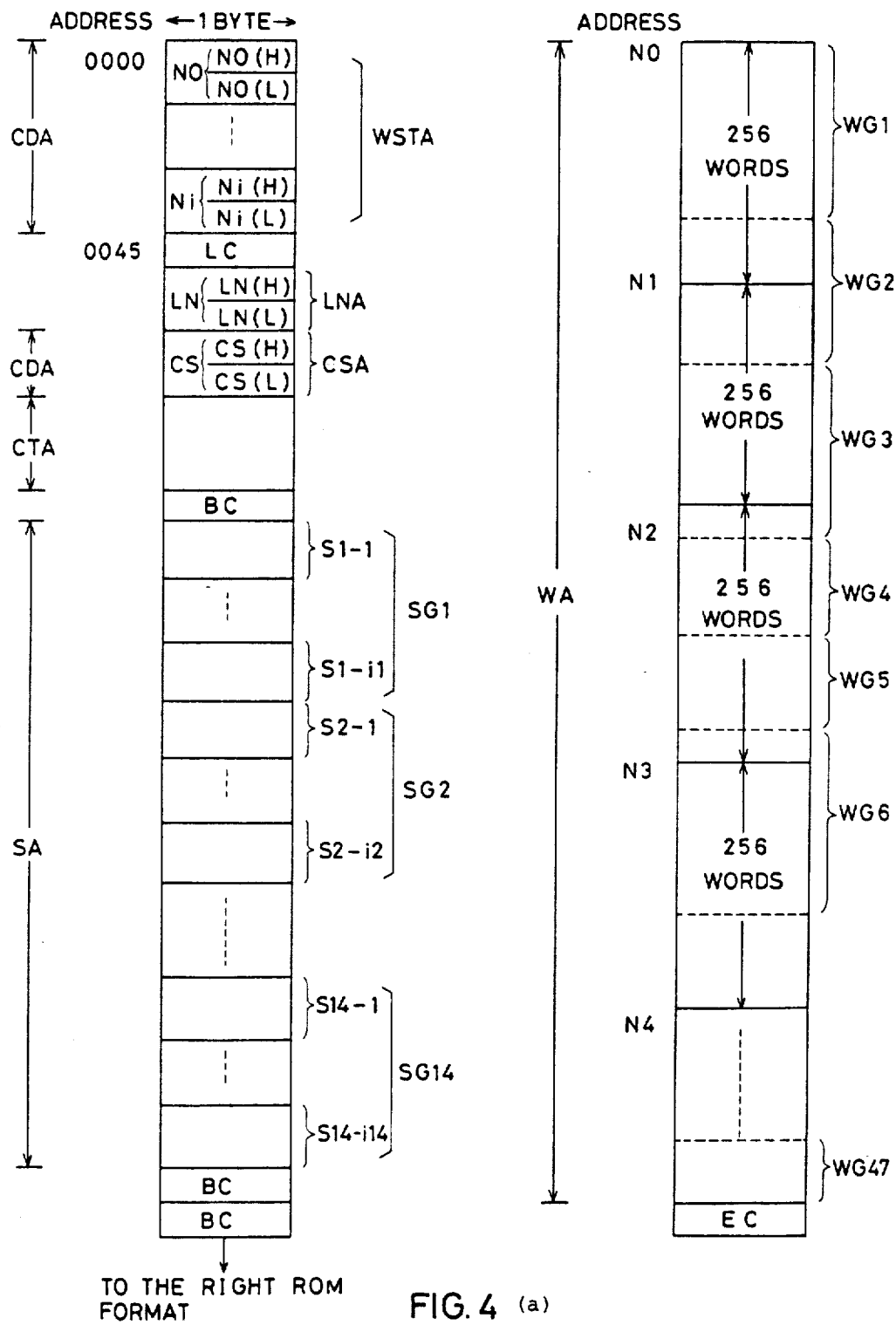
FIG. 4(a) shows a format of a ROM for storing words, the ROM being connected in the circuit of FIG. 2.
FIGS. 4(b) through 4(d) show formats of various types of aROM's, the ROM being connectable to the circuit of FIG. 2.

FIG. 4(a) shows a format in which a great number of words are stored in each of the ROM's 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect those spellings having high frequency in occurrence. The thus selected English spelling is changed to corresponding compression codes for data storage purposes. The data-compression table CTA stores data for ascertaining the correspondence between the selected spellings and the compression codes.

When correspondence between an input word and one or words stored in one of the ROM's is to be detected, the input word is changed to codes inclusive of one of the compression codes according to the contents of the data-compression table CTA since each of the ROM's stores codes which may include one of the compression codes. The table CTA is used to show words stored in one of the ROM's by changing the codes to the original spelling. This table is different depending on the language to make the degree of data compression the greatest.

Stored words are classified in 47 categories in each of which a number of words are ordered. In FIG. 4(a) a word category "n" is referred to WGn. Sentences are formed by a combination of a plurality of stored words. These sentences are classified as 14 categories, in each of which a number of sentences are ordered. In FIG. 4(a), a sentence category "m" is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows the relationship between the serial number of the category and the name of the category.

TABLE 1-1

| The serial number of the category | corresponding key | the name of the category |
|---|---|---|
| 1 | "ra" or "c" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words may contain 256 words. A first word address table region WSTA contains a first address referred to as $N_0, N_1, N_2, \ldots N$; in FIG. 4(a). This first address is related to a location in which a first code or first compressed code for representing the first word is stored. In accordance with a specific example of the present invention, each address is represented by two bytes. Each first address is separated into an upper byte referred to No(H) to Ni(H) and a lower byte referred to No(L) to Ni(L). The first word address table region is used to shorten retrieval time for a specific word.

CS is used to refer to a first sentence address CS(H) and CS(L) which is stored in a first sentence address region CSA. LNA indicates a memory location for storing a serial number of a word indicating the specific language as referenced by LN of LN(H) and LN(L). More particularly, as the ROM storing English words is concerned, a word "English" is necessarily contained in that ROM. In such a case, serial the number of the word "English" in the ROM is LN starting from the first word of the same kind of word group. Storing the serial number LN is suitable for showing the mother language and the foreign language being selected in the character indicator 3 because it is unnecessary to additionally store a word showing the language.

The translator of the present invention may comprise audible sound generating means for developing words represented in the mother language and/or the foreign language. Since such an audible sound generating means is disclosed in, for example, Hyatt, U.S. Pat. No. 4,060,848 issued Nov. 29, 1979, further description thereof is omitted.

In FIG. 4(a), LC indicates a language code in which the first four bits indicate a field of language stored in the ROM and the last four bits the kind of language stored in the ROM. In particular, there may be present a ROM for storing words oriented to economy, engineering or medicine, respectively. Information representing such a field is stored in LC. The last four bits corresponds to each language as follows:

TABLE 1-2

| The last four bits | the language |
|---|---|
| 0 0 0 1 (1) | English |
| 0 0 1 0 (2) | German |

TABLE 1-2-continued

| The last four bits | the language |
|---|---|
| 0 0 1 1 (3) | Japanese |
| 0 1 0 0 (4) | French |
| 0 1 0 1 (5) | Spanish |
| 0 1 1 0 (6) | another language "O" |
| 0 1 1 1 (7) | a further language "A" |

In FIG. 4(a) BC, "11111111" is a boundary code and EC "11111111" is an end code of the ROM.

Figure 4D:
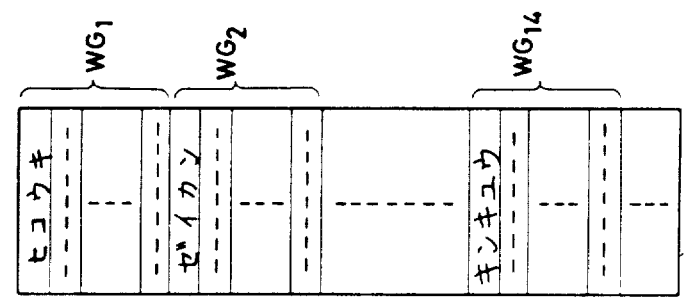
Figure 4C:
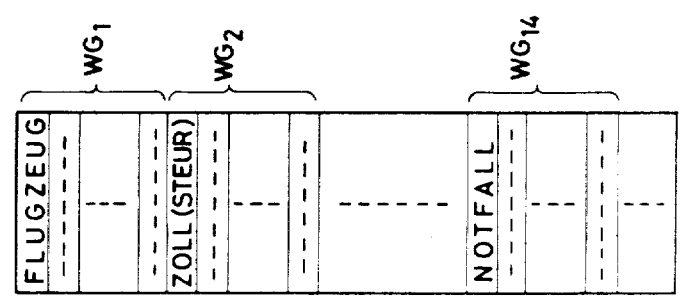
Figure 4B:
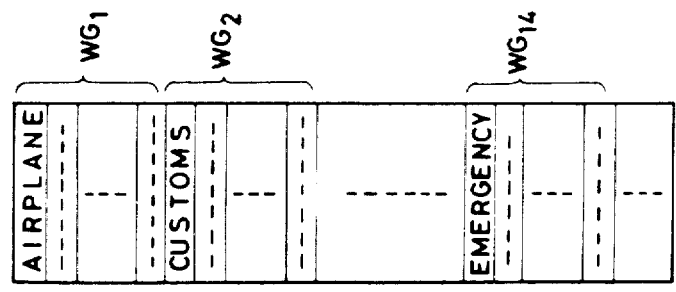

FIGS. 4(b) through 4(d) show the formats of word categories in various ROM's containing English words, German words and Japanese words, respectively. These category words are featured in that each first word stored in each category is the name of each category.

Figure 5:
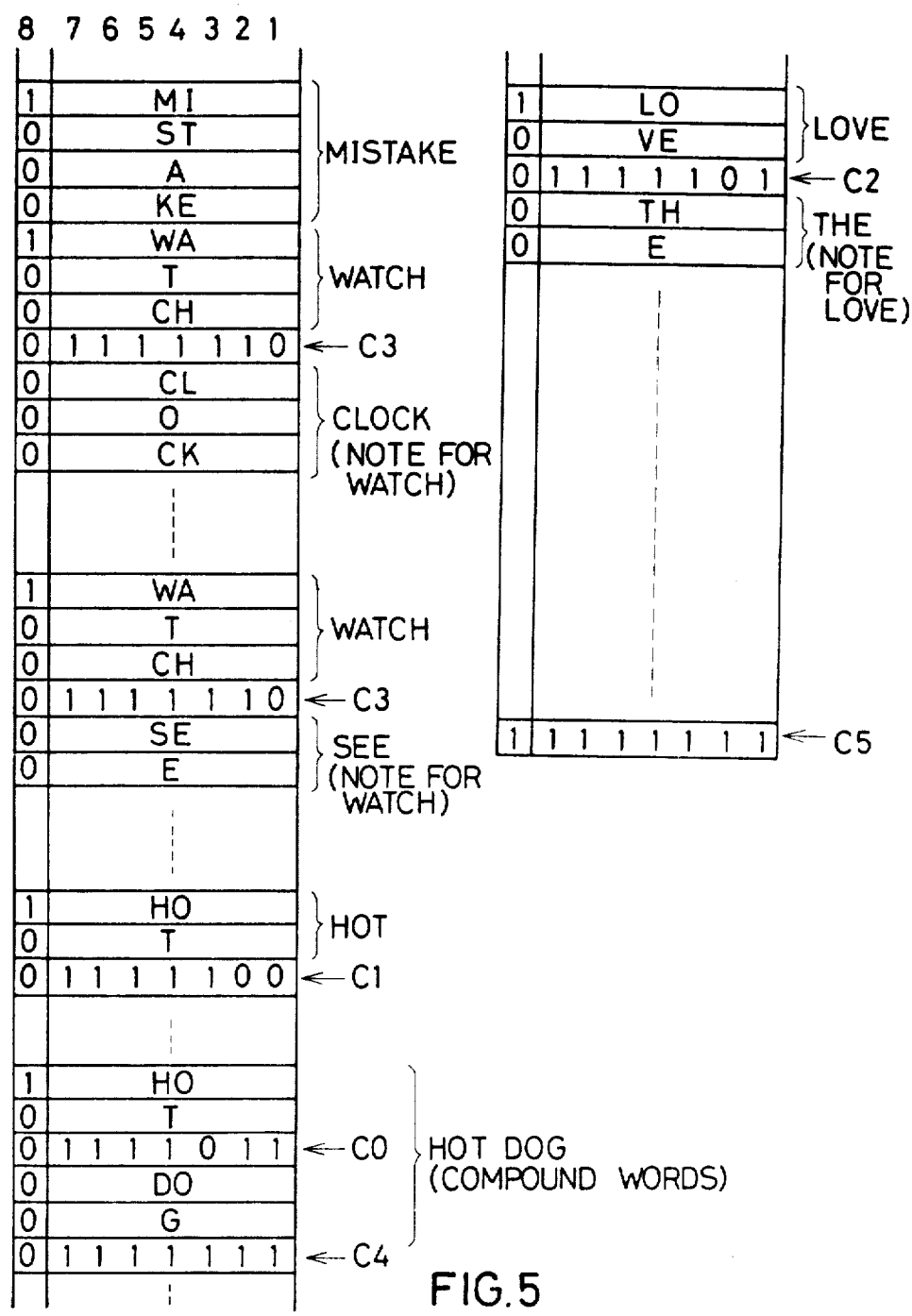
FIG. 5 shows a detailed format of a word data region WA in the format of FIG. 4(a)

FIG. 5 shows a detailed format in a word data region WA in the format of FIG. 4(a) where the ROM stores English words.

In the word data region WA, word data is ordered at the unit of 1 byte. The eighth bit of the first word in each word category is defined as "1" while the eighth bit of the second or more words is defined as "0". The first bit through the seventh bit are letter codes representing letters or compression codes representing groups of letters in compressed manners. For example, a word "WATCH" is stored such that a pair of letters "WA" is represented by a single compression code of 1 byte, a second pair of letters "CH" are represented by another single compression code of 1 byte and the letter "T" is represented by a letter code of 1 byte. Therefore, the five letters of "WATCH" are stored within three bytes.

Each word and each specific meaning for it correspond to separate translated word. A word identical with another at least in spelling and a homonym, which is a word identical with another in spelling and pronunciation, are stored with an identifying note. FIG. 5 represents a word "WATCH" having two meanings of "CLOCK" and "SEE" so that a note is added to each as "WATCH (CLOCK)" and "WATCH (SEE)" within brackets. These notes each follow a note code C3 (7E in hexadecimal notation) in the word data region. The bracket for the note follows the noted word, normally. But, it may precede the noted word when appropriate for more easily conveying meaning in which case the note follows the note code C2 (7D in hexadecimal notation). In FIG. 5, a note "THE" for a word "LOVE" is provided so as to be "(THE)LOVE", i.e., the noun rather than the verb.

A compound term formed by at least two words corresponds to each translated word. FIG. 5 shows an example of a compound term "HOT DOG". Between the two words "HOT" and "DOG", a space code Co (7B in hexadecimal notation) is inserted. If at least one of the two words is stored separately in one of the ROM's and is the first word of a compound term, the last letter code of the word (the compression code) is followed by a compound code C1 (7C in hexadecimal notation). The word "HOT" in FIG. 5 is this type of word to thereby be followed by the compound code C1. The compound code C1 is intended to indicate that there are present one or more compound terms starting with the word "HOT".

As described above, the stored words are classified in 47 categories. A category separation code C4 (7F in hexadecimal notation) is provided for separating each category. This code at the end of all the words in the same category. In FIG. 5, this code follows the compound "HOT DOG". At the end of the word data region WA, an end code C5 (FF in hexadecimal notation) is provided.

FIG. 6 shows a table containing the letter codes, the compression codes, and the control codes each of which is used in the format of FIG. 5.

In the word data region, each item of the word data occupies 1 byte. Thus, it might be possible to provide 256 kinds of alternation in connection with one kind of data by use of the eight bits. But, the eighth bit (see FIG. 5) is used to indicate the first data relating to each stored word. The remaining seven bits can be selectively combined to provide 128 kinds of alternation in connection with one category of data.

The codes in the shaded parts in the table of FIG. 6 are the figure codes, the symbol codes, and the control codes all of which are used in common with the respective languages. In the remaining parts, the letter codes (alphabets in FIG. 6) and the compression codes are provided. The control codes C0 to C5 function as described with respect to FIG. 5.

FIG. 7 shows a detailed format of the compression table, related to the English words, in the format of FIG. 4(a). The format of FIG. 7 corresponds to the compression table of FIG. 6.

In FIG. 7, the lower seven bits in an eighth bit of "1" represent individual letters as letters codes. The lower seven bits in an eighth bit of "0" are the compression codes for the preceding individual letter codes. An end code C6 is provided for representing the end of the compression codes. The compression table for each language is different from each other, depending on the language so as to select the highest efficiency.

FIGS. 8(a) through 8(d) show detailed formats of the sentence data region SA in the format of FIG. 4(a) related to English or Japanese.

A plurality of words form a sentence where each of the words is stored using the appropriate compression codes.

At the start of a word, the eighth bit is represented as "1". One or more letter codes or compression codes representing a particular word are contained thereafter before the next occurrence of an eighth bit of "1". For separating sentences, two types of codes C7 and C8 are used. C7 is added following an affirmative sentence and C8 is added following an interrogative sentence. The code C7 is "FE" in hexadecimal notation and C8 is "FC" in the same.

As described above, the stored sentences are classified into 14 categories. A category separation code C9 is used for indicating separation between the categories. The code C9 is represented as "FF" in hexadecimal notation. This code C9 always follows the code C7 or the code C8. This is illustrated in FIG. 8(a) which shows a sentence "GOOD LUCK." which is stored at the end of a particular sentence category.

It may be possible that the same sentence is included in two or more categories. In such a case, to reduce the number of bytes for the memory, the sentence is stored as such in a first category while only the leading address of the stored sentence in this category is stored in another type of category. An address memory code C10 (FD in hexadecimal notation) is used for this control purpose. Two bytes following the code C10 are used to memorize an address "SSA" for the code (compression code) of the leading letter of the first word contained in the sentence which is in common.

As a feature of the translator according to the present invention, one or more words in an exemplary sentence in an original language can be modified by substituting one or more other words in the original language to form another sentence in the original language. The thus modified sentence is translated. Such words which can be altered are provided within brackets in the displayed form of the sentence. At most, two words can be altered in a single sentence as shown in FIG. 8(a).

Figure 8A:
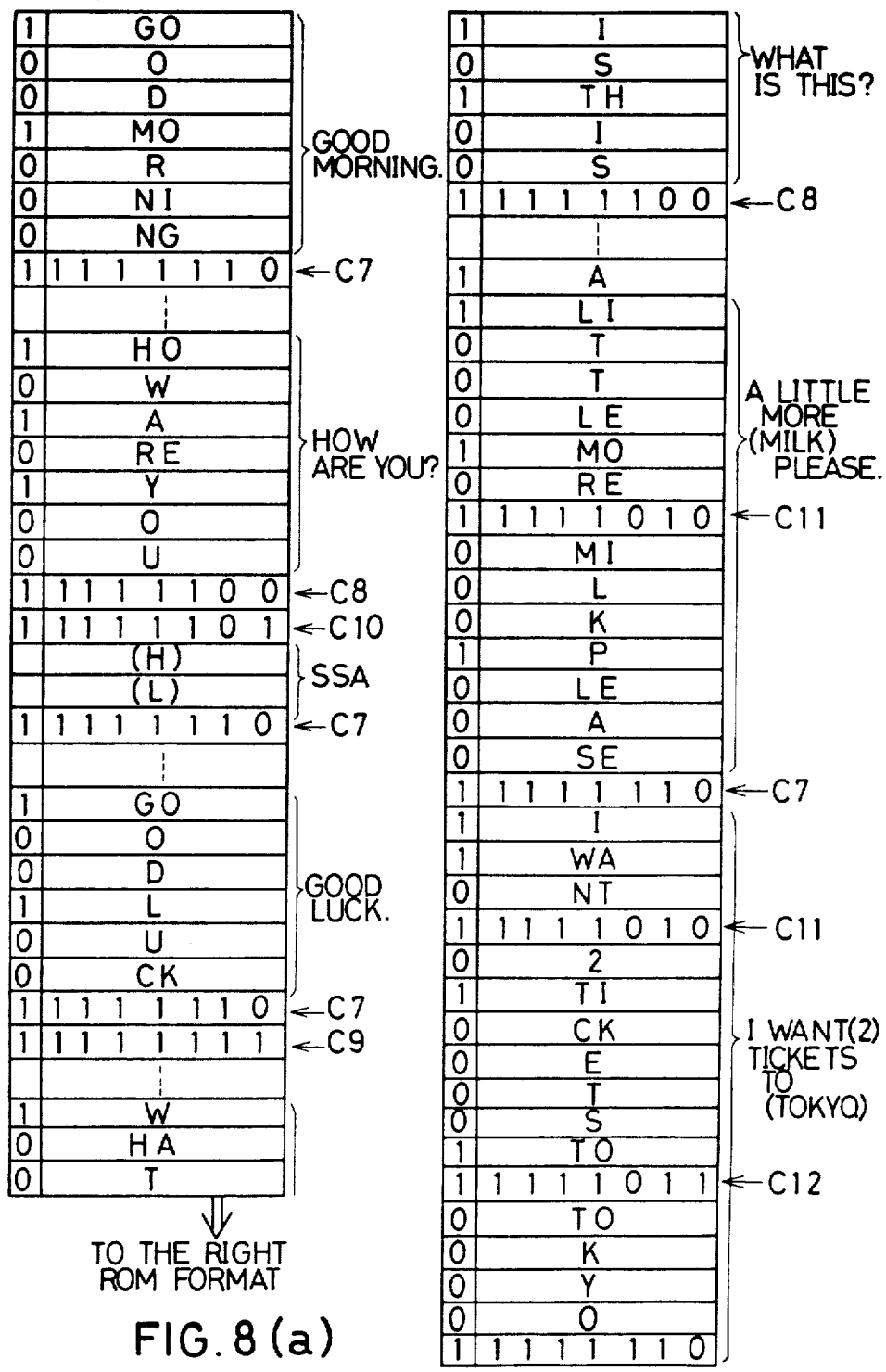
Figure 9:
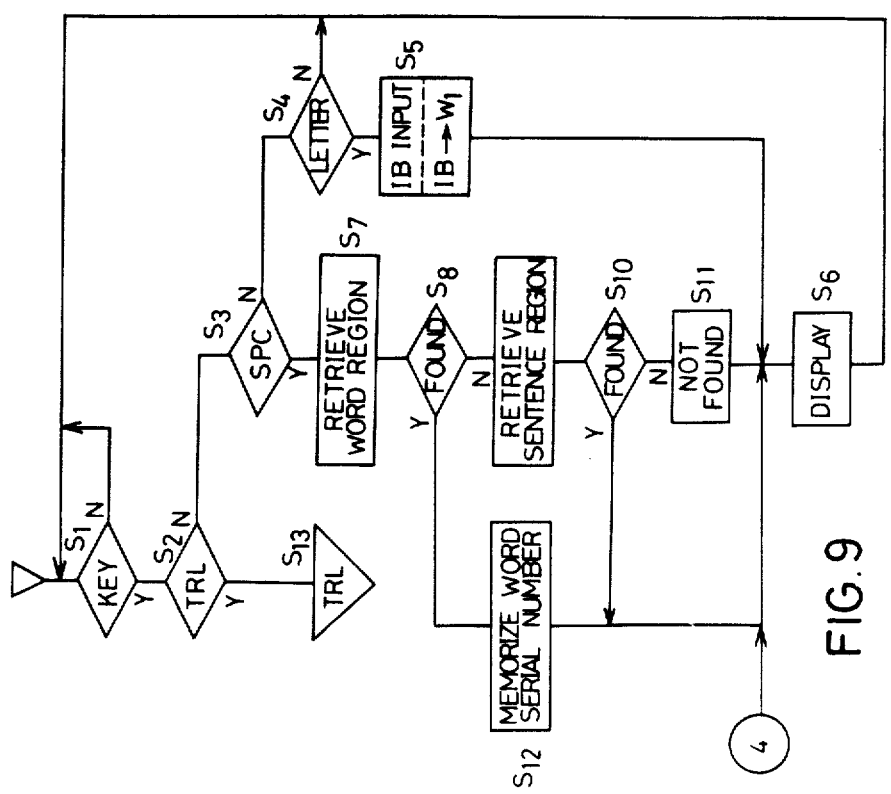

FIG. 8(a) shows an exemplary sentence of "A LITTLE MORE (MILK) PLEASE.". A word provided within brackets is specified by a bracket "1" code C11 (FA in hexadecimal notation).

With the eights bit of "0" following this code C11, the lower seven codes are letter codes (the compression code). When two words are to be inserted within the brackets as being a phrase or an idiom, the code C11 is inserted between the words. For example, a phrase of "CHECK IN" is inserted between the words to thereby form a code line of "Code C11, CHECK, Code C11, IN" as indicated in FIG. 8(b).

FIG. 8(c) shows another example, say, "I WANT (2) TICKETS TO (TOKYO)." when represented in English. "(2)" is represented by use of the code C11 while "(TOKYO)" is represented by use of another bracket code C12 (FB in hexadecimal notation). No limitation is present that the code C11 necessarily precedes the code C12. FIG. 8(c) shows an example represented in Japanese. As indicated in FIG. 8(c), the code C12 precedes the code C11 since the order of words is different between English and Japanese.

In this type of translator, the first brackets in an English sentence are represented with the code C11 and the second brackets in the English sentence are represented with the code C12. In another language except English, the first brackets (which are former in the English translated sentence) are represented with the code C11 and the second brackets (which are latter in the English translated sentence) are represented with the code C12. When only one bracket pair is used in a sentence the code C11 is necessarily used.

OPERATION OF THE TRANSLATOR (1) Display

With reference to FIG. 1, the letter indicator 3 displays alphabets, alphabetical characters, Japanese "Katakana" letters, figures and symbols. The language indicator 4 displays the marks " " and " ". The symbol indicator 5 contains the symbols MT, KA, SN and WD as specified with the symbol " ", and the star "*". Indication of these symbols is enabled under control fo the driver 6 by retrieving corresponding word data from the microcomputer 8.

(2) Translation Principle

The system of FIG. 2 has the capability of translating three languages from one to another. A specific type of ROM stores a great number of words and sentences as is shown in FIG. 4(a). Each of the stored words and sentences corresponds to a respective one of the translated words and sentences in the other ROM's. This correspondence is assured by the number of words and sentences which are in common between the ROM's. More particularly, a specific sentence "GOOD MORNING." is assumed to be stored as the 100th sentence in a ROM that stores data corresponding to English words and sentences.

The corresponding Japanese sentence is stored as the 100th sentence in another ROM that is related to Japanese. A further corresponding German translated sentence "GUTEN MORGEN." is stored similarly as the 100th sentence in a further ROM that is related to German.

Similarly, the same technique can be applied in connection with words so that a specific word ordered at a particular serial number in one ROM corresponds to its translated word ordered at the like serial number in another ROM.

Conducting the translation by the translator lies in finding the serial number of a word or a sentence in the mother language ROM and, accordingly thereafter, in detecting the appropriate translated word or sentence having the like serial number in the appropriate foreign language ROM.

The translation operation comprises the following steps:
(i) the first step: selecting a specific ROM of the mother language;
(ii) the second step: detecting the serial number of a desired word or a sentence in the thus selected ROM;
(iii) the third step: selecting another specific ROM of the selected foreign language; and
(iv) the fourth step: detecting the translated word or sentence having the like serial number in the other selected ROM.

(3) Translation of a Specific Sentence Addressed with Selection of a Category

With reference to FIG. 1, keys identified as $L_1$ through $L_{14}$ are category selection keys. If necessary, a picture or other graphical representation suggesting the kind of category may be provided adjacent to each of the category selection keys. Selection by each of these keys is enabled following actuation of a SN/WD key 41 where the indicator 5 indicates the mark " ".

A SRC key 42 is actuated for seaching subsequently a plurality of sentences belonging to the same category. After the last sentence in the category is outputted, the first sentence in this category is to be addressed. When a sentence is addressed, the serial number of this sentence is outputted. A TRL key 43 is actuated for enabling the third step and the fourth step as described in item 2 to provide translation of this sentence.

Translation of a specific sentence addressed with selection of a category is enabled according to the following steps:
(i) the first step: selecting a specific ROM of the mother language;
(ii) the second step: illuminating the mark " " by actuating the key 41;
(iii) the third step: actuating one of the category keys $L_1$ through $L_{14}$;
(iv) the fourth step: actuating subsequently the SRC key 42 so that the serial number of the specific sentence is detected and the translation key 43 is actuated;
(v) the fifth step: selecting another ROM of a foreign language;
(vi) the sixth step: detecting the translated sentence having the like serial number in the other selected ROM.

(4) Translation of an Inputted Word

The spelling of a word to be translated is entered by actuating letter keys 44 and the translation key 43 is actuated to provide translation from the mother language to the foreign language indicated in the indicator 4. Some cases may be different from one another depending on the word entered as follows.

(i) the spelling entered is not found in the ROM of the mother language;
(ii) only one spelling of the word identical with the spelling entered is present in the ROM of the mother language;
(iii) a plurality of spellings identical with the spelling entered are present in the ROM of the mother language.

In connection with item (i), no word is stored which is identical with the entered word. This is indicated by a double exclamation mark "!" following the end of the entered word which is displayed after actuation of the translation key 43.

In connection with item (ii), the serial number of the identical spelling in the ROM of the mother language is detected and selection of the ROM storing the foreign language is enabled, and a translated work having the same serial number in the selected ROM of the foreign language is detected and displayed.

More particularly, it is supposed that English is selected as the mother tongue and Japanese is selected as the foreign tongue. A word "SEE" is entered and the translation key 43 is actuated. Under the circumstances, the first word in the English ROM is addressed so that equivalency between spelling of the entered word and the first word is determined. When there is no equivalency, a counter for storing the serial number of the word is advanced by one to address the second word. If the word of "SEE" is detected in the English ROM by advancing the address of the counter up to the serial number, say, 500 of this word, equivalency is detected. The Japanese ROM is then selected so that a translated word is retrieved by specifying the serial number 500 of the Japanese ROM. Translation is thus enabled.

In connection with item (iii), these homonyms are noted in the stored format as indicated in FIG. 5. A specific meaning is determined by the operator of the translator. A specific display with a note and a mark "!?" following the entered word is enabled to indicate that the entered word has a plurality of translated words. In particular, a word "WATCH" of FIG. 5 is assumed to be entered. Firstly, this word is entered and the translation key 43 is actuated whereupon the display 3 indicates

"WATCH (CLOCK) !?".

Now the search key 42 is actuated to indicate another stored word and meaning for the word "WATCH", i.e., "WATCH (SEE) !?"

While either of these alternative displays is present, the translation key 43 may be actuated to obtain a corresponding translated Japanese word. At the same time, when the homonym is entered as indicated by the notes, the indicator 5 illuminates the symbol " " directed to MT indicating that there are one or more additional translated words equivalent to the entered word.

(5) Translation of Two or More Entered Words

The instant translator can translate two or more entered words. The space key 45 is actuated to separate these words from one another. When the first word is entered and the space key 45 is actuated, the second word can be entered if the first word entered is contained in the ROM of the mother language. If the first word is not stored in the ROM or belongs to the homonym, an operation similar to items (i) and (iii) is conducted.

Under the circumstances that all of the words "I", "AM", "A" and "BOY" are assumed to be stored in the English ROM, entry operation of "I", "SPC", "AM", "SPC", "A", "SPC" and "BOY" is conducted to indicate in the display 3.

"I AM A BOY".

Upon actuation of the translation key 43, translated words are presented in the display 3 with the order of the translated words being identical to the order of the entered words in the mother language. That is, regardless of the proper grammatical order according to the grammer in the translated language, the translated words respectively corresponding to the entered words are directly aligned as were the English words. The star "*" is illuminated in the indicator 5 representing this situation.

(6) Entry of words with the brackets and translation thereof

With reference to FIG. 8(a), an exemplary sentence "A LITTLE MORE (MILK) PLEASE." is addressed and displayed as "A LITTLE MORE ((MILK)) PLEASE." Upon actuation of the translation key 43, a translated sentence which is stored in the format of FIG. 8(d) in the Japanese version, is displayed in which the translated Japanese word corresponding to "((MILK))" is indicated within a single set of brackets.

While the exemplary English sentence is indicated, a word "COFFEE" may be entered by the alphabetical keys 44 to amend displayed sentence to read "A LITTLE MORE ((COFFEE)) PLEASE."

Upon actuation of the translation key 43, a corresponding translated sentence is formed and displayed only on the condition that the word "COFFEE" is stored in the English ROM. When not, an operation similar to item (i) or (iii) of item (4) should be conducted.

Modification and translation of the word provided with the brackets are effected follows:

A sentence with the brackets is addressed by following the first to the fourth steps of item (3) and thereafter:

(v) the fifth step: the word contained within the brackets in the addressed sentence is replaced by the word entered before the translation key 43 is actuated;

(iv) the sixth step: in the ROM of the mother language, a word having the spelling of the entered word is detected and the serial number thereof is detected.

In case where such a word can not be detected in the ROM or where there are two or more words having the spelling of the entered word, an operation similar to item (i) or (iii) of item (4) occurs. The following steps should be effected corresponding to item (ii) of item (4).

(vii) the seventh step: selecting the ROM of the foreign language;

(viii) the eighth step: extracting a sentence having the same serial number as the stored serial number from the ROM of the foreign language so that the sentence is applied to the buffer register 23. The C11 code or the C12 code is also applied to the buffer register; and (ix) the ninth step: extracting the word having the same serial number as that of the word which is detected in the sixth step and inserting the extracted word between the brackets represented by the bracket code applied to the buffer register 23 in the eighth step.

With respect to a sentence having two sets of brackets, the bracket key 46 is actuated for inserting a desired word between the brackets. The following sentence is exemplified.

"I WANT ((2)) TICKETS TO (TOKYO)"

The first set of brackets is displayed as double set of brackets while the latter ones are displayed as single brackets. And then an entered word or phrase is led to be inserted between the double brackets. Upon actuation of the bracket key 46, the single bracket is replaced by the double brackets while the double brackets are replaced by the single bracket. Thus, the word contained in the latter and now double brackets can be replaced by a newly entered one. The position of the double brackets is changed each time the bracket key 46 is actuated. Translation of the entered word or phrase is conducted in the manner as described above.

(7) Retaining the word without translation

A holding key 47 referred to as "HLD" is actuated for identifying a person's name or a proper noun which can and should not be translated. Actuation of the holding key 47 follows entry of this kind of word. Even when the translation key 43 is actuated, this kind of word is not translated. If the translation key 43 is actuated following entry of this kind of word, the double exclamation mark is added to the end of the entered word, which is indicated, as described in item (4). In such a case, the translation key 43 is further actuated, the above holding operation is effective in the same manner as in the case of actuation of the holding key 47.

(8) Automatically retaining the entered word without translation

Figures "0" through "9" and symbols "$", "." (period) ":" (colon), "?" (question mark) are not subjected to translation under the condition that they are not added to any other words. No necessity is required to actuate the holding key 47.

(9) Addressing words classified in the categories

As shown in FIG. 4(a), the words are classified into 47 categories so that each of the words can be addressed in the similar manner as in the case of addressing each of the sentences according to category.

(10) Searching each of words entered by the keyboard

Each of words entered by the keyboard can be randomly accessed according to its spelling.

Now, it is described how the translated sentences are made by using an intact word which is inputted and is not contained as data for the translated sentences in the memory, according to the present invention. FIGS. 9, 10, 11 and 12 show flow charts of the operation for this purpose.

Throughout the flow charts, respective characters represent the following circuit elements. IB indicates a buffer for storing key input information. WB indicates a buffer for storing the serial number of any word. WI is a buffer for storing the original sentence inputted by key operation as a gathering of all the words in the original sentence. WM represents a buffer for storing at least one sentence which is accessed from the memory. Characters "n" and "m" are suffixed to represent serial numbers of words contained in the sentence stored in the buffers WI and WM. Character "n" is a pointer for storing information corresponding to the buffer $WI_n$.

Character "m" is a pointer for storing information corresponding to the buffer $WMm$. PN indicates a counter for storing the serial numbers of the sentences stored in the memory. F is a flag for showing that a particular outputted one of the sentences has a word enclosed by the parentheses.

The translation of the present invention is carried out as follows:

(1) Detecting whether an inputted sentence corresponds to any sentence having no word contained in parenthesis Key input of words in some original sentence is subsequently held to select $S_1 \to S_2 \to S_3 \to S_4 \to S_5$. Code information representing the respective words is applied to the buffer WI so that $S_6$ is selected to display the sentence. The operation is repeated until each of the buffers IB and WI contains code information for representing a word. Then, the "SRC" key 45 is actuated to select $S_1 \to S_2 \to S_3 \to S_7$. $S_7$ is executed to detect whether the word in the buffer IB is stored in the word data region WA in the format of FIG. 4(a) by searching the memory.

When it is detected that no corresponding word is found in the word data region WA, $S_9$ is selected to determine whether the word in the buffer IB is stored in the sentence data region SA in the format of FIG. 4(a) by searching that memory. Since the sentence data region SA stores a great number of sentences containing words, the search is for correspondence between any one of the words forming the sentences and the word in question. When no word corresponding to the word is found in the sentence data region SA, $S_{11}$ is selected to confirm that no corresponding word is found. $S_6$ is then selected to display "NOT FOUND".

Figure 10:
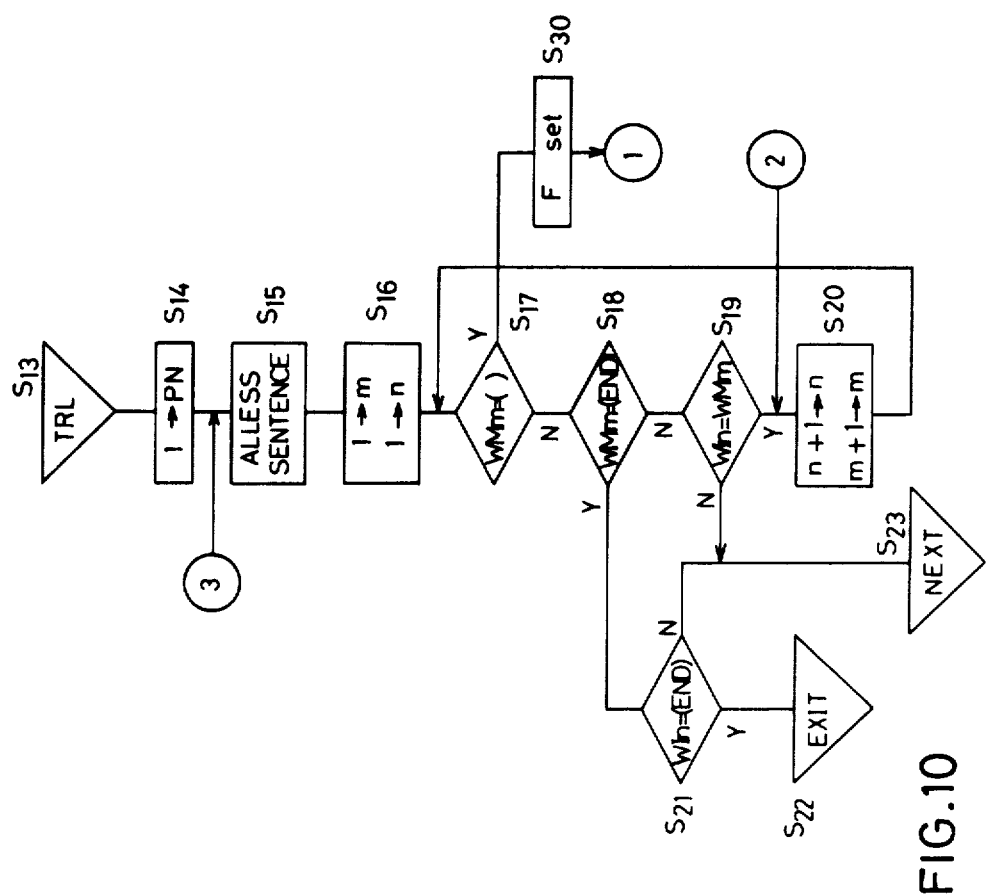

If $S_8$, it is detected that a corresponding word is stored, $S_{12}$ is selected in which the serial number of the detected word is entered into an additional buffer except the buffer WB. According to repetition of the input operation, any original sentence can be inputted. Translation is enabled by actuating the "TRL" key 43 as seen in $S_1 \to S_2 \to S_{13}$. $S_{13}$ is shown in FIG. 10.

In $S_{14}$, the contents of the counter PN are set in an initial condition by inputting "1" thereto. $S_{15}$ is selected to output the sentence corresponding in serial number to the contents of the counter PN from the sentence data region SA and enter it into the buffer WM.

Then, the contents of the buffers WI and WM are subjected to examination for correspondence. $S_{16}$ is selected to set the pointers "m" and "n" in the initial states by inputting "1" thereto. The contents of the buffer WM, say, WMm is read out to determine whether it is the code for indicating the parentheses or the "(END)" code for indicating the period or the question mark. If it is not, the contents of the buffer WI, say, WIn is read out to examine the measurement in $S_{17} \to S_{18} \to S_{19}$.

For description, a particular sentence is exemplary. It is assumed that the following sentence is key inputted.
"HOW ARE YOU ?"

FIG. 13(a) shows a condition of the buffer WI for storing the sentence. $S_{19}$ of the flow chart of FIG. 10 is selected to measure whether WM1 in the buffer WM stores "HOW" or not. When "YES" is given, the next word is subjected to the examination. For this purpose, $S_{20}$ is selected to incrementally advance the pointers "n" and "m". $S_{19}$ is executed to examine whether the contents of $WM_2$ store "ARE".

The examination is repeated until it is detected that all the words including the "END" code correspond. When this is detected, $S_{18} \to S_{21} \to S_{22}$ is selected to follow the flow chart of FIG. 12(b). When this is not detected, $S_{19} \to S_{23}$ is selected to lead to the flow chart of FIG. 12(a). In $S_{24}$, it is detected whether the serial number of the sentence is the "END" code or not. When not, the counter PN is advanced by one to access the next sentence in $S_{25} \to 3 \to S_{15}$. All of the sentences are subjected to examination for correspondence. When no corresponding sentence is detected, $S_{24} \to S_{26}$ is selected to translate word for word.

To translate word for word is accomplished by merely outputting all of the individually translated words corresponding to the serial numbers of all the individual words. If any entered word by key input is not stored in the word data region WA, such a word can not be translated so that it is outputted without any translation and the spelling of the entered word is directly outputted.

When it is detected that the sentence in question corresponds totally to a stored one, $S_{27}$ of FIG. 12(b) is selected to read in one translated sentence corresponding to the counters of the counter PN, so that the sentence is displayed. That is, since the flag F is reset, $S_{27} \to S_{28} \to 4 \to S_6$ is selected to display one Japanese translated sentence.

(2) Detecting whether an inputted sentence corresponds to any sentence having any word contained in parentheses It is assumed that the sentence as shown in FIG. 14(b) is stored in the sentence data region SA. The following sentence is key inputted for translation:
"I WANT 2 TICKETS TO KYOTO."

$S_{15}$ is selected to read out the sentence as shown in FIG. 14(b). "I" and "WANT" can reach each corresponding word. Then, $S_{17}$ is selected to detect that $WM_3$ is the parentheses code. In $S_{30}$, the flag F is set to lead to $S_{31}$ of the flow chart of FIG. 11. In $S_{31}$, "2" is added to the pointer "m". In $S_{32}$, it is detected whether $WM_5$ contains the parentheses code. $S_{33}$ is selected to detect whether $WM_5$ contains the "(END)" code. When "NO", $S_{34}$ is selected to detect whether $WI_3$ contains the "(END)" code. According to this instance, $WI_3$ contains "2", and so $S_{35}$ is selected to store the contents, "2" into the buffer WB. This buffer WB usually stores the serial number of the word. But in this instance it stores the figure "2" as such because the figure can not be translated.

$S_{36}$ is selected to count up the pointer "n" by one. $S_{37}$ is selected to detect whether $WI_4$ contains the "(END)" code. If not, $S_{38}$ is selected to find out whether the contents of $WI_4$ are identical with those of $WM_5$. If they are identical, $S_{20}$ of FIG. 10 is selected to examine the next word.

In this instance, $WM_7$ contains the parentheses code when n=6 and m=7. $S_{17} \to S_{30} \to 1 \to S_{31}$ is selected. Since $WM_9$ is the "(END)" code, $S_{33} \to S_{39}$ is selected to store the contents of $WI_6$, "KYOTO" into the buffer WB. As "KYOTO" is a proper noun, it is not stored in the word data region WA so that its spelling itself is entered into the buffer WB. When it is stored in the buffer WB, it is detected that it corresponds to the word in the first parentheses or the second parentheses.

In $S_{40}$, the pointer n is counted up by one. In $S_{41}$, it is detected that $WI_7$ corresponds to the "(END)" code. Accordingly, it is found that the key inputted sentence agrees with the outputted sentence except for the word in the parentheses. $S_{41} \rightarrow S_{22} S_{27}$ is then selected. $S_{27}$ is selected to find a translated sentence equivalent to the outputted sentence. $S_{29}$ is selected to alter the word inside the parentheses in the translated sentence. "2" stored in the buffer WB replaces the inner word of the first parentheses and "KYOTO" replaces the inner word of the second parentheses. The resultant translated sentence is displayed. Since the parentheses are added to "2" and "KYOTO" while the sentence is displayed, it is easy to recognize that the sentence is formed by altering part of the stored sentence.

The above example is that at least one word inside the stored sentence corresponds to at least one word in the inputted sentence. In addition, at least one word inside the parentheses in the memorized sentence may correspond to two or more words in the inputted sentence. In such a case, the inputted sentence can be translated.

Figure 11:
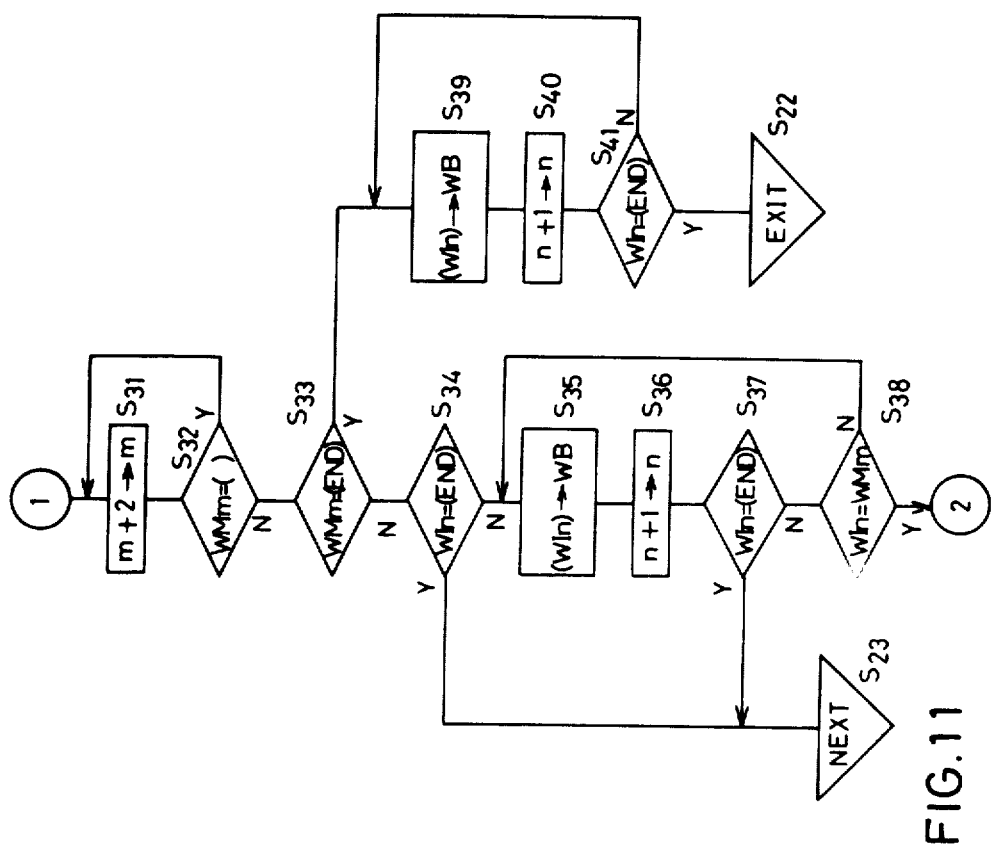
Figure 12:
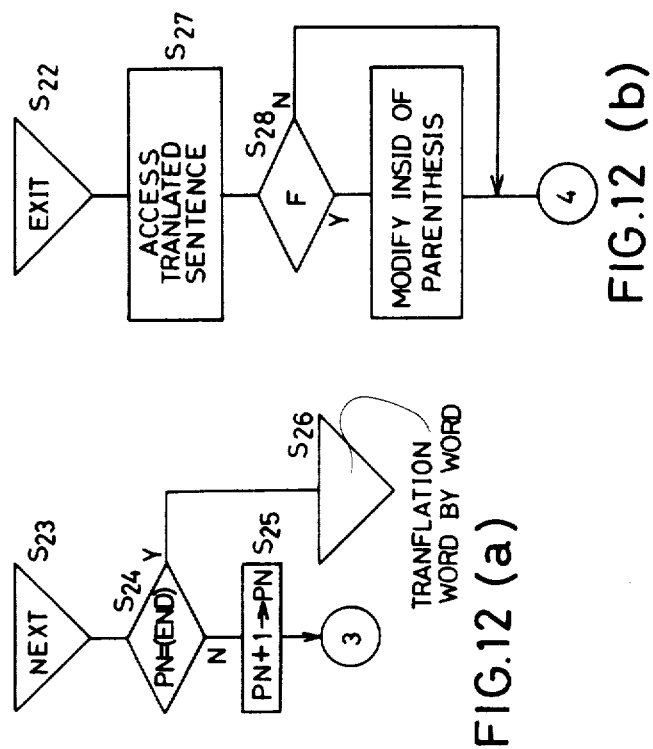

For example, the following sentence is memorized.
"MAY I HAVE (MILK)?"
The inputted sentence as written below can be translated in which translated words corresponding to "TOAST AND COFFEE" are inside the parentheses.
"MAY I HAVE TOAST AND COFFEE?"
For this purpose, a loop of $S_{33} \rightarrow S_{39} \rightarrow S_{40} \rightarrow S_{41} \rightarrow S_{39} \ldots$ of FIG. 11 is repeated. In $S_{39}$, each serial number of "TOAST", "AND" and "COFFEE" is stored in the buffer WB. In $S_{29}$ of FIG. 12(b), a translated word inside the parentheses in the translated sentence can be replaced by new ones.

Even when two or more words in one set of parentheses in the stored sentence correspond to one or more words in the inputted sentence, it will be evident from the flow chart that such an inputted sentence can be translated.

Figures 15A, 15B:
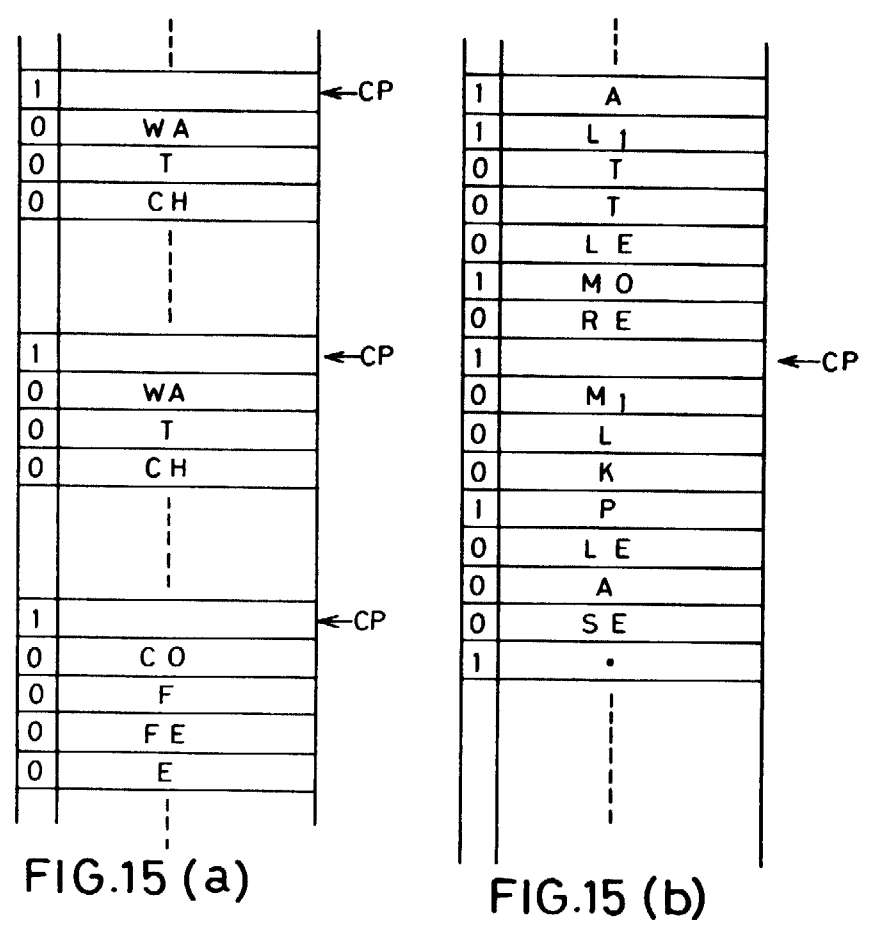

FIG. 15(a) shows another detailed format of the word data region WA. FIG. 15(b) shows another detailed format of the sentence data region SA.

With reference to FIG. 15(a), each word is stored and accompanied by a code CP of each part of speech used for identifying a noun, a verb, etc. In FIG. 15(a), a word "WATCH", as a moun, meaning "CLOCK" is accompanied by the code CP indicating the noun. Another word "WATCH", as a verb, meaning "SEE" is accompanied by the code CP indicating the verb. Still another word "COFFEE" is together with the code CP indicating the noun.

In FIG. 15(b), the following sentence is memorized.
"A LITTLE MORE (MILK) PLEASE."
In this case, the code CP is used to show the part of speech of the word inside the parentheses. It indicates the noun.

In translation of the sentence, the code CP is examined for agreement. In $S_{35}$ or $S_{39}$ in the flow chart of FIG. 11, before the serial number of the word or the spelling of the word is stored in the buffer WB, it is detected whether the part of speech of the word inside the parentheses in the stored sentence is identical with that of the word in the inputted sentence. When they agree, the translation is enabled. When they do not agree, the inputted sentence is translated word for word. Otherwise, the operator is advised that they do not agree.

Thus, it is possible that a word having the same part of speech as that of the word inside the parentheses in the stored sentence be selected.

When the word inside the parentheses in the stored sentence is a proper noun, a code for showing it is also stored. As the proper noun is not stored in the word data region WA, no code for the proper noun can be found in the region. In such a case, by supporting that the word is a proper noun, the code can be examined for agreement.

Additionally, the code CP of FIG. 15(a) can store a serial number of a sentence which can be used. For example, when "COFFEE" can replace the word inside the parentheses of the sentence numbered as the 8th and the 15th, the word "COFFEE" is stored accompanied by two codes indicating the 8th and the 15th sentences. When two or more parentheses are contained in one sentence, the serial number of the parentheses, in which a replaceable word is contained, is stored as well as the serial number of the sentence.

The invention being thus described, it will be obvious that the same may be varied in many ways. Such variations are not to be regarded as a departure from the spirit and scope of the ivention, and all such modifications are intended to be included within the scope of the following claims.

What is claimed is:

1. An improved electronic translator wherein a first sentence in a first language is translated into a second sentence in a second language, the translator comprising
   input means for entering the first sentence into the translator,
   a first memory means for storing a plurality of words and sentences in the first language, the plurality of words and sentences being stored at respectively specific addresses,
   a second memory means for storing a like plurality of words and sentences in the second language, each of the plurality of words and sentences in the second memory means being stored at a specific address that is equivalent to the address of a corresponding word or sentence in the first memory means,
   selection means for selecting from among the sentences and words stored in the first memory means that combination of words to produce a translatable sentence that is most equivalent to the first sentence entered by said input means,
   access means responsive to the selection means for retrieving a sentence and words from addresses in the second memory means equivalent to those of the most equivalent sentence selected by the selection means to achieve a second, translated sentence in the second language that is most equivalent to the first sentence, and
   output means responsive to the access means for outputting the second, translated sentence in the second language.

2. An improved electronic translator according to claim 1, wherein at least some of the sentences stored in the first memory means include words that are marked so that other words may be readily substituted therefor.

3. An improved electronic translator according to claim 2, wherein at least some of the sentences having marked words therein have a plurality of such marked words.

4. An improved electronic translator according to claim 3, wherein a maximum of two words are marked.

5. An improved electronic translator according to claim 3, wherein the words are marked by enclosing them in parenthesis.

6. An improved electronic translator according to claim 5, wherein two words are marked with one word enclosed by a single set of parenthesis while the other word is enclosed in a double set of brackets.

7. An improved electronic translator according to claim 6, wherein means are provided responsive to the input means for permitting another word to be substituted for each one of the marked words sequentially.

8. An improved electronic translator according to claim 5, wherein a plurality of related words are enclosed within parenthesis.

9. An improved electronic translator according to claim 2, wherein the first memory means stores a code indicative of a part of speech associated with a marked word.

10. An improved electronic translator according to claim 1, wherein means are provided responsive to the input means for inserting any word not found in the first memory means directly into the translated sentence.

11. An improved electronic translator according to claim 1, wherein the selection means includes detection means responsive to the input means for detecting whether an input word is stored in the first memory means, and insertion means responsive to the detection means for inserting an input word not stored in the first memory means into the translated sentence being retrieved by the access means.

12. An improved electronic translator according to claim 1, wherein the selection means initially searches the sentences stored in the first memory means for a substantially equivalent sentence and, if none is found, to secondarily search the first memory means for individual words from which to form the first sentence.

13. An improved electronic translator according to claim 12, wherein the selection means further detects all differences between the substantially equivalent sentence and the first sentence and to search the first memory means for individual words constituting all differences detected.

14. An improved electronic translator according to claim 1, wherein the output means comprises a display.

15. An improved electronic translator wherein a first sentence in a first language is translated into a second sentence in a second language, the translator comprising input means for entering the first sentence into the translator, a first memory means for storing a plurality of words and sentences in the first language, the plurality of words and sentences being stored at respectively specific addresses, a second memory means for storing a like plurality of words and sentences in the second language, each of the plurality of words and sentences in the second memory means being stored at a specific address that is equivalent to the address of a corresponding word or sentence in the first memory means, first access means responsive to the input means for retrieving a sentence from those sentences stored in the first memory means, first detection means responsive to the first access means and the input means for detecting the sentence from those sentences stored in the first memory means that is most equivalent to the first sentence entered by the input means and for identifying any differences that exist between the first sentence and the most equivalent sentence, second access means responsive to the first detection means for retrieving a word from those words stored in the first memory means, second detection means responsive to the first detection means and the second access means for detecting whether a word from those words stored in the first memory means is equivalent to any difference identified by the first detection means between the first sentence and the most equivalent sentence and for identifying any differences that continue to exist between the first sentence and the most equivalent sentence, first insertion means responsive to the second detection means for inserting each word detected by the second detection means into the most equivalent sentence, third access means responsive to the first and second detection means and the first insertion means for retrieving a sentence and words from addresses in the second memory means equivalent to those of the most equivalent sentence detected by the first detection means and the words detected by the second detection means to achieve a second, translated sentence in the second language that is most equivalent to the first sentence, second insertion means responsive to the second detection means and third access means to insert any continuing differences identified by the second detection means into the second sentence untranslated, and output means responsive to the third access means and second, insertion means for outputting the second translated sentence in the second language.

16. An improved electronic translator according to claim 15, wherein at least some of the sentences stored in the first memory means include words that are marked so that other words may be readily substituted therefor.

17. An improved electronic translator according to claim 16, wherein at least some of the sentences having marked words therein have a plurality of such marked words.

18. An improved electronic translator according to claim 17, wherein a maximum of two words are marked.

19. An improved electronic translator according to claim 17, wherein the words are marked by enclosing them in parenthesis.

20. An improved electronic translator according to claim 19, wherein two words are marked with one word enclosed by a single set of parenthesis while the other word is enclosed in a double set of brackets.

21. An improved electronic translator according to claim 20, wherein means are provided responsive to the input means for permitting another word to be substituted for each one of the marked words sequentially.

22. An improved electronic translator according to claim 19, wherein a plurality of related words are enclosed within parenthesis.

23. An improved electronic translator according to claim 16, wherein the first memory means stores a code indicative of a part of speech associated with a marked word.

24. An improved electronic translator according to claim 15, wherein the first memory means includes no sentence equivalent to the first sentence, wherein the second detection means serially detects whether words stored in the first memory means are equivalent to each successive word in the first sentence such that the first sentence is thereby translated word-by-word.

25. An improved electronic translator according to claim 15, wherein the output means comprises a display.

26. A method of translating a first sentence in a first language into a second sentence in a second language comprising the steps of
storing a plurality of words and sentences in a first memory means, each of the plurality of words and sentences being stored at respectively specific addresses,
storing a like plurality of words and sentences in the second language in a second memory means, each of the plurality of words and sentences in the second memory means being stored at a specific address that is equivalent to the address of a corresponding word or sentence in the first memory means,
selecting from among the words and sentences stored in the first memory means that combination that is most equivalent to the first sentence, and
retrieving from the second memory means a translated sentence equivalent to the combination selected from the first memory means.

27. A method according to claim 26, wherein the step of inserting all untranslatable words from the first sentence into the translated sentence is further included.

28. A method according to claim 27, wherein the selecting step is further comprised of the steps of
determining whether any sentence stored in the first memory means has a measure of equivalency to the first sentence,
identifying any differences that exist between the first sentence and a sentence determined to have a measure of equivalency to it, and
searching the first memory means for each word in the first sentence not found in a sentence determined to have a measure of equivalency to the first sentence.

29. A method according to claim 27, wherein at least some of the sentences stored in the first memory means include words that are marked so that other words may be readily substituted therefor.

30. A method according to claim 29, wherein at least some of the sentences having marked words therein have a plurality of such marked words.

31. A method according to claim 30, wherein a maximum of two words are marked.

32. A method according to claim 30, wherein the words are marked by enclosing them in parenthesis.

33. A method according to claim 32, wherein two words are marked with one word enclosed by a single set of parenthesis while the other word is enclosed in a double set of brackets.

34. A method according to claim 33, wherein means are provided responsive to the input means for permitting another word to be substituted for each one of the marked words sequentially.

35. A method according to claim 32, wherein a plurality of related words are enclosed within parenthesis.

36. A method according to claim 29, wherein a code indicative of a part of speech associated with a marked word is stored in the first memory means.

37. A method according to claim 27, wherein there is included the further step of displaying the translated sentence.

* * * * *